United States Patent [19]
Kraupa

[11] 3,796,286
[45] Mar. 12, 1974

[54] DEVICE FOR COMPENSATING RUPTURE FORCES IN INSTALLATION COMPONENTS AND STRUCTURES, PARTICULARLY IN NUCLEAR POWER PLANTS

[75] Inventor: Werner Kraupa, Erlangen, Germany

[73] Assignee: Siemens Aktiengesellschaft, Berlin, Germany

[22] Filed: Dec. 9, 1971

[21] Appl. No.: 206,395

[30] Foreign Application Priority Data
Dec. 10, 1970 Germany............................ 2060794

[52] U.S. Cl.................................. 188/1 C, 293/70
[51] Int. Cl............................................. F16f 7/12
[58] Field of Search............... 188/1 B, 1 C; 74/492; 293/70

[56] References Cited
UNITED STATES PATENTS

| | | | |
|---|---|---|---|
| 2,275,573 | 3/1942 | Sturm et al. | 188/1 C |
| 3,209,864 | 10/1965 | Boyd | 188/1 C |
| 3,552,525 | 1/1971 | Schudel | 188/1 C |

*Primary Examiner*—Duane A. Reger
*Attorney, Agent, or Firm*—Herbert L. Lerner

[57] ABSTRACT

To compensate rupture forces in equipment components and structures plastically deformable damping elements having a load capacity that is central as well as inclined to the longitudinal axis thereof, and formed of a material that flows or yields at a predetermined pressure and having a cross-sectional dimension which varies substantially over the entire length thereof, are disposed between respective adjacent structural members.

9 Claims, 3 Drawing Figures

DEVICE FOR COMPENSATING RUPTURE FORCES IN INSTALLATION COMPONENTS AND STRUCTURES, PARTICULARLY IN NUCLEAR POWER PLANTS

The invention relates to device for compensating or counterbalancing rupture or fracture forces in equipment components and structures, particularly in nuclear power plants.

When a rupture or fracture occurs, for example, in pressurized pipelines or components of an installation, such as in a nuclear power plant, particularly, very large forces occur momentarily. Components can thereby be torn from their anchoring and can cause great consequential damage. It is accordingly especially important that the safety enclosure or containment structure of the reactor building is not penetrated. Penetration is generally sought to be prevented by providing bracing devices which conduct the forces into the foundation of the reactor building. However, specific minimum clearance or play must be provided between such bracing devices and the structural components so that the thermally produced displacements which occur during operation of the reactor are not impeded.

It is accordingly an object of the invention to provide a device which will compensate or counterbalance such rupture forces so that very extensive damage is avoided.

With the foregoing and other objects in view, there is provided in accordance with the invention, device for compensating rupture forces in equipment components and structures, particularly in nuclear power plants, which include mutually adjacent force-producing and force-absorbing structural members, including a damping element disposable between the force-producing and force-absorbing structural members and having a load capacity that is central as well as inclined to the longitudinal axis thereof, the damping element being formed of plastically deformable material flowable at a predetermined pressure applied thereto and having a cross section varying over substantially the entire length thereof so that the damping element deforms over a distance increasing initially in proportion to an increase in a rupture force applied to the damping element until a predetermined force is being applied to the damping element, whereafter the deformation distance increases to a greater extent than proportionately to the applied force until a predetermined maximum force is being applied to the damping element.

These damping elements of the invention function to brake the displacement of the components caused by the reaction forces, when a rupture occurs, so that the rupture forces and the retarding or braking forces do not exceed a definite predetermined value.

In order to attain an appropriate deformation of the damping elements with a proportional force-distance relationship, in accordance with another feature of the invention, the damping element is formed with at least one encircling recess on the outside thereof or is provided with at least one cavity in the interior thereof.

In accordance with a further feature of the invention, the force-absorbing structural member is formed with a central hole for receiving therein the flowing material of said damping element and is additionally formed with a recess of greater diameter than that of the central hole so as to limit the maximum value of the rupture force.

In accordance with other features of the invention, the damping element preferably comprises a cylindrical body having an encircling, groove-like recess with inclined flanks formed in the outer surface thereof. The recess has a depth of at least one half the radius of the cylindrical damping element. Due to this shape of the damping element, assurance is provided that when rupture forces are initially applied, reliable deformation will occur whereby part of the forces will already be absorbed. Pure aluminum or soft steel which have appropriate flow or creep properties are especially suitable for the damping elements.

In accordance with an added feature of the invention, the damping element proper is bolted to the force-absorbing structural member through a holding plate which is spherically shaped on a side thereof facing away from the damping element and toward a force-producing structural member. Displacement of the force-producing structural member relative to the support therefor, on the one hand, as well as prestressing of the damping element, on the other hand, are thereby rendered possible.

Other features which are considered as characteristic for the invention are set forth in the appended claims.

Although the invention is illustrated and described herein as embodied in device for compensating rupture forces in installation components and structures, particularly in nuclear power plants, it is nevertheless not intended to be limited to the details shown, since various modifications and structural changes may be made therein without departing from the spirit of the invention and within the scope and range of equivalent of the claims.

The construction and method of operation of the invention, however, together with additional objects and advantages thereof will be best understood from the following description of specific embodiments when read in connection with the accompanying drawing, in which.

Figure 1:
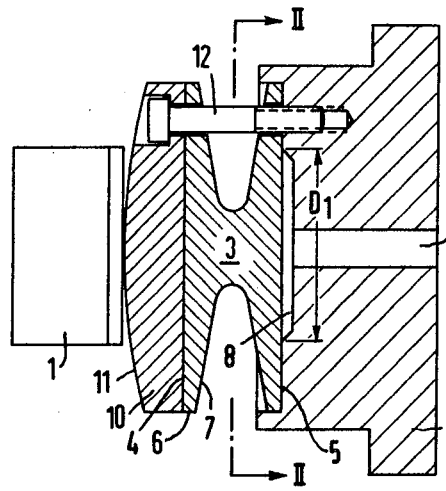
FIG. 1 is a longitudinal sectional view of a damping device according to the invention.

Referring now to the drawing and first particularly to FIG. 1 thereof, there is shown a force-producing structural member such as a rupture-prone component of an installation, for example, of which only a support or bearing member 1 is shown in FIG. 1 and a force-absorbing structural member 2. The damping element 3 must be of such shape that, in the event of a rupture, it is initially deformable itself in order thereby to absorb part of the rupture forces. This means that the damping element must not be of wholly solid construction but must be provided with suitable recesses or cavities which become initially filled in when the deformation occurs.

Figure 2:
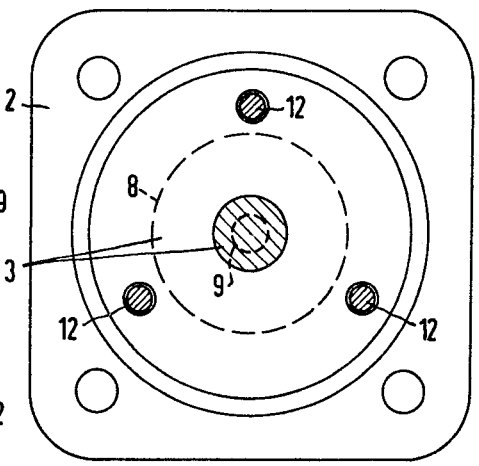
FIG. 2 is a cross-sectional view of FIG. 1 taken along the line Ii - II in the direction of the arrows.

An embodiment meeting the foregoing requirements is shown in FIGS. 1 and 2. The damping element 3 is formed of a cylindrical body having two opposite end faces 4 and 5 as well as a cylindrical surface 6. The cylindrical body is formed with an encircling groove-like recess 7 at the outer cylindrical surface 6 thereof. This recess 7 is defined by flanks or lateral surfaces that are inclined to the non-illustrated longitudinal axis of the damping element 3.

For support, the damping element 3 abuts the supporting force-absorbing structural member 2 only with the outer area of the end face 5 of the damping element because the member 2 is formed with a dish-shaped depression 8 at the surface region thereof located opposite the central area of the end face 5 of the damping element 3. Furthermore, the structural member 2 is formed with a central bore 9, the importance of which will be described hereinafter.

On the side of the damping element 3 facing the structural member support 1, there is further disposed a circular plate 10 formed with a spherically curved surface 11 serving as a bearing member for the structural member support 1. The bearing or holder plate 10 is connected to the force-absorbing structural member 2 by bolts 12, thereby clamping the damping element 3 therebetween.

Figure 3:
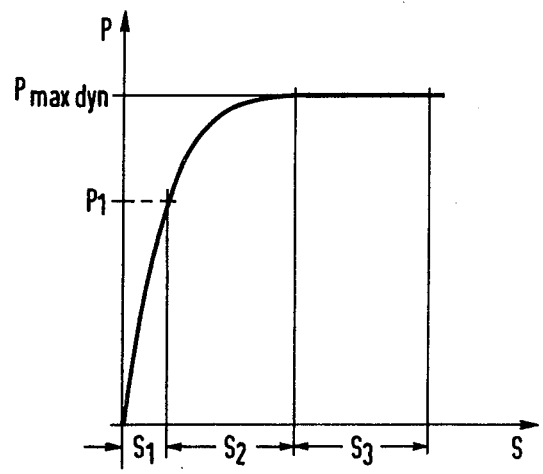
FIG. 3 is a plot diagram of applied force against deformation distance showing the characteristic curve of the deformation which occurs in the damping device.

The function of the damping element 3 will be explained hereinafter with reference to the deformation characteristic curve which is shown in FIG. 3. In the plot diagram of FIG. 3, the rupture force P, which acts upon the damping element 3 when a rupture occurs, is plotted against the extent of the deformation or the deformation distance S of the damping element 3.

Accordingly, the deformation distance in the region $S_1$ of the diagram is initially proportional to the acting force, so that the characteristic curve shows a linear rise. The desired slope of this first part of the characteristic curve is adjustable by suitably varying the thickness of the damping element 3 as well as the pretensioning of the damping element 3 by the bolts 12 and the span $D_1$ between the surfaces of the structural member 2 engaging the end face 5, corresponding to the diameter of the depression or recess 8. After reaching the point $P_1$ on the diagram, a further deformation of the damping element 3 occurs in the transition region $S_2$ up to a certain maximum force $P_{max\ dyn}$, which corresponds to the dynamic force maximally acting up on the structural member. This transition region $S_2$ in which the deformation distance increases greater than proportionally to the acting force, is attained by suitably shaping the damping element 3 and by a starting flow of material.

After reaching the point $P_{max\ dyn}$, a further deformation of damping member 3 occurs solely due to the flow of the material. The maximum force is then limited by a deformation process which is similar to that of an extrusion process in that the damping element 3, which is preferably formed of mild steel or pure aluminum, is pressed into the central bore or hole 9, formed in the structural member 2.

The maximum force which occurs, can be brought sufficiently close to the maximum value of the rupture force by suitably selecting the diameter of the bore 9, the support device 2 being accordingly designable for this maximum load.

The hereinbefore described damping element 3 and the damping device of the invention are suitable for reducing the force, which can rise above all limits when a shock occurs, to a maximum force slightly above the maximum value of the rupture force. The aforedescribed damping elements 3 present special advantages since they constitute no maintenance and are rather inexpensive to manufacture. Forces having directions of application which deviate from the longitudinal axis of the damping element 3, and which are incident at an inclination to the end face 4, can also be damped with the foredescribed embodiment of the damping element 3 of the invention.

The invention of this application is, of course, not confined to the embodiment shown in the drawings but covers all embodiments which have a damping characteristic corresponding to the characteristic curve shown in FIG. 3 and which are also suited for the absorption of forces which occur or are applied at an angle to the longitudinal axis of the damping element.

What is claimed is:

1. Device for compensating rupture forces in equipment components and structures, particularly in nuclear power plants, which include mutually adjacent, force-producing and force-absorbing structural members, comprising a damping element disposable between the force-producing and force-absorbing structural members and having a load capacity that is central as well as inclined to the longitudinal axis thereof, said damping element being formed of plastically deformable material flowable at a predetermined pressure applied thereto and having a cross section varying over substantially the entire length thereof with the smallest cross section being disposed substantially centrally so that said damping element deforms over a distance increasing initially in proportion to an increase in a rupture force applied to said damping element until a predetermined force is being applied to said damping element, said force-absorbing structural member having a central bore for receiving therein flowing material of the damping element, whereby after said deformation distance increases to a greater extent than proportionately to the applied force, application of said predetermined maximum force to said damping element causes said damping element to flow into said central bore.

2. Device according to claim 1, wherein said damping element is formed with at least one encircling recess on the outside thereof.

3. Device according to claim 1, wherein the force-absorbing structural member is additionally formed with a recess of greater diameter than that of said central hole.

4. Device according to claim 1, wherein said damping element comprises a cylindrical body having an encircling, groove-like recess with inclined flanks formed in the outer cylindrical surface thereof.

5. Device according to claim 4, wherein said recess has a depth of at least one half the radius of said cylindrical damping element.

6. Device according to claim 4, wherein said damping element has an end face engageable at a marginal region thereof with the force-absorbing structural member for supporting and holding said damping element.

7. Device according to claim 1, wherein said damping element is formed of pure aluminum.

8. Device according to claim 1, wherein said damping element is formed of mild steel.

9. Device according to claim 1, wherein said damping element has a first end face presentable toward the force-absorbing structural member and a second end face presentable toward the force-producing structural member, and including a holding plate located at said second end face and having a spherically shaped surface facing away from said damping element and toward the force-producing structural member, and bolt means extending from said holding plate through said damping element for securing the latter to the force-absorbing structural member.

* * * * *